US008050562B2

(12) United States Patent
Lee et al.

(10) Patent No.: US 8,050,562 B2
(45) Date of Patent: Nov. 1, 2011

(54) APPARATUS FOR IMPLEMENTING ELECTRO-OPTICAL CATV NETWORK AND SIGNAL PROCESSING METHOD USED BY THE APPARATUS

(75) Inventors: Heyung Sub Lee, Daejeon (KR); Jae Hoon Yu, Daejeon (KR); Dong-Beom Shin, Daejeon (KR); Hong Soon Nam, Daejeon (KR); Young Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 956 days.

(21) Appl. No.: 11/952,837

(22) Filed: Dec. 7, 2007

(65) Prior Publication Data

US 2008/0138071 A1  Jun. 12, 2008

(30) Foreign Application Priority Data

Dec. 8, 2006  (KR) .................. 10-2006-0125128

(51) Int. Cl.
*H04J 14/00* (2006.01)

(52) U.S. Cl. .............. 398/72; 398/67; 398/68; 398/69; 398/71; 398/100; 370/352; 370/468; 370/392; 370/389; 725/125; 725/127; 725/129; 725/105; 725/106

(58) Field of Classification Search .............. 398/66, 398/67, 68, 69, 70, 71, 72, 79, 83, 58, 59, 398/98, 99, 100, 75, 74; 370/352, 468, 389, 370/392, 465, 477, 390, 442, 420, 395.3, 370/395.53; 725/125, 126, 127, 129, 105, 725/106, 114, 116, 117, 119
See application file for complete search history.

(56) References Cited

U.S. PATENT DOCUMENTS

| 7,412,169 | B2 * | 8/2008 | Joo et al. ................. 398/72 |
| 7,783,196 | B2 * | 8/2010 | Combs et al. ............ 398/72 |
| 7,818,648 | B2 * | 10/2010 | Haran ................... 714/752 |
| 2004/0105687 | A1 * | 6/2004 | Myong et al. ........... 398/202 |
| 2004/0165889 | A1 | 8/2004 | Mahony et al. |
| 2005/0053376 | A1 * | 3/2005 | Joo et al. ................. 398/72 |
| 2006/0067685 | A1 * | 3/2006 | Gottwald ................. 398/25 |
| 2006/0182444 | A1 * | 8/2006 | Doh et al. ................ 398/69 |

FOREIGN PATENT DOCUMENTS

| KR | 2005-0025514 | 3/2005 |
| KR | 2005-0081147 | 8/2005 |
| KR | 2006-0070877 | 6/2006 |

OTHER PUBLICATIONS

G. Kramer et al, "Ethernet passive optical network (EPON): building a next-generationoptical access network" IEEE Communications Magazine, vol. 40, No. 2, (Feb. 2002), pp. 66-73.
G. Kramer et al., "IPACT: a dynamic protocol for an Ethernet PON (EPON)" IEEE Communications Magazine, vol. 40, No. 2, (Feb. 2002), pp. 74-80.

* cited by examiner

*Primary Examiner* — Hanh Phan
(74) *Attorney, Agent, or Firm* — Rabin & Berdo, P.C.

(57) ABSTRACT

Provided is an apparatus for implementing an electro-optical cable distribution network in which a coaxial cable is replaced with an optical cable in order to provide a service integrating broadcast data and communication data by solving a frequency constraint problem in a cable television (CATV) network employing a conventional hybrid-fiber coaxial (HFC) network architecture. The apparatus includes an optical network unit (ONU) which converts a downstream signal received from a system operator (SO) into an optical signal and transmits the optical signal to an optical cable; and an optical cable modem which receives the optical downstream signal from the ONU and converts the received signal into an electrical signal. In addition, the ONU and the optical cable modem control signal quality of an optical path.

14 Claims, 7 Drawing Sheets

APPARATUS FOR IMPLEMENTING ELECTRO-OPTICAL CATV NETWORK AND SIGNAL PROCESSING METHOD USED BY THE APPARATUS

CROSS-REFERENCE TO RELATED PATENT APPLICATION

This application claims the benefit of Korean Patent Application No. 10-2006-0125128, filed on Dec. 8, 2006, in the Korean Intellectual Property Office, the disclosure of which is incorporated herein in its entirety by reference.

BACKGROUND OF THE INVENTION

1. Field of the Invention

The present invention relates to a cable television (CATV) network, and more particularly, to an apparatus for performing a function required when a coaxial cable of a conventional hybrid-fiber coaxial (HFC) network is replaced with an optical cable in order to implement a fiber to the home (FTTH) network, and a data processing method used by the apparatus.

This work was supported by the IT R&D program of MIC/IITA.[2005-S-401-02, Optical Subscriber and Access Network Technology]

2. Description of the Related Art

Subscriber distribution networks can be classified into wired type networks and wireless type networks. Subscriber distribution networks use a wired/wireless integrated network to provide a service combining communication and broadcasting. Examples of currently widely used wired subscriber distribution networks include a digital subscriber line (xDSL) and a hybrid-fiber coaxial (HFC) network. Such subscriber distribution networks rapidly developed in the form of a fiber to the home (FTTH) network in response to consumer demand for an integration service in which broadcasting is combined with communication over an existing network mainly providing a multimedia service. In xDSL, a passive optical network (PON) is highly expected to be used in implementation of the FTTH network. In general, an Ethernet PON (EPON) or a gigabit PON (GPON) employing a time division multiplexing (TDM) method is used.

FIG. 1 illustrates a structure of a CATV network employing a conventional HFC network architecture.

Referring to FIG. 1, the CATV network includes a system operator (SO) 110, which is a service provider that provides a broadcast service to a subscriber by modifying a channel of a program received from a program provider (PP) and a channel of its own production program, and a cable subscriber distribution network 120 which transmits a signal from the SO 110 to a subscriber's cable modem 140. The cable subscriber distribution network 120 is referred to as a HFC network since an optical cable and a coaxial cable coexist from a distribution center 118 to the subscriber's cable modem 140. The cable subscriber distribution network 120 provides a CATV broadcast service and a data service. The SO 110 includes broadcast equipment 112, which sends received contents to a subscriber or sends the received contents to the subscriber after inserting its own advertisements or subtitles, a cable modem termination system (CMTS) 115, and the distribution center 118. The cable subscriber distribution network 120 of the CATV network includes an optical network unit (ONU) 122 which accesses an optical signal transmitted from the SO 110, i.e., the service provider, and a trunk line amplification splitter 125 which amplifies and splits a signal converted into an electronic signal by the ONU 122. In order to access the SO 110 using the optical signal and to transmit/receive a radio frequency (RF) signal to/from the subscriber's cable modem 140 using the coaxial cable, the ONU 122 performs an optical-to-electrical or electrical-to-optical conversion function. The trunk line amplification splitter 125 amplifies an attenuated signal so that the RF signal is transmitted to many subscribers. Alternatively, the trunk line amplification splitter 125 splits a signal so that connections can be made for many subscribers. The subscriber's cable modem 140 is a subscriber terminal device capable of interactive data communication. An RF signal channel is controlled by the CMTS 115.

FIG. 2 is a functional block diagram of an ONU in a CATV network employing a conventional HFC network architecture.

Referring to FIG. 2, in the ONU, a downstream transmitter 201 and an upstream transmitter 236 independently perform their functions. The downstream transmitter 201 includes an optical-to-electrical converter 210, a voltage regulator 215, equalizers 220 and 230, and a pre-amplifier 225 and a post-amplifier 235.

The optical-to-electrical converter 210 converts an optical signal transmitted from an SO into an electrical RF signal in the frequency range of 50 MHz to 780 MHz. The voltage regulator 215 regulates a voltage level of the RF signal. The first equalizer 220 equalizes a frequency characteristic of the RF signal whose voltage level is regulated. In particular, the signal equalizer 220 reproduces an attenuated high frequency component. Since a low power RF signal is received, the pre-amplifier 225 amplifies a signal level according to an input level required by the post-amplifier 235. In practice, a signal is split in the ONU so as to accommodate many subscribers. Therefore, the post-amplifier 235 is required. The second equalizer 230 equalizes a frequency characteristic of the amplified RF signal. Furthermore, the second equalizer 230 reproduces an attenuated portion of the signal after amplification. The post-amplifier 235 amplifies an actual RF signal by increasing it to a level suitable for transmission.

The upstream transmitter 236 includes an amplifier 250, an equalizer 255, a low-pass filter 260, and an electrical-to-optical converter 265.

The amplifier 250 amplifies the RF signal received upstream in the frequency range of 5 MHz to 48 MHz. The equalizer 255 equalizes a frequency characteristic of the amplified upstream RF signal. The low-pass filter 260 passes only a frequency band of the upstream RF signal so as to remove noise generated in a high frequency band. The electrical-to-optical converter 265 converts an electrical RF signal in the frequency range of 5 MHz to 48 MHz into an optical signal of 1310 nm and transmits the converted optical signal to the SO.

FIG. 3 is a functional block diagram of a cable modem in a CATV network employing a conventional HFC network architecture.

Referring to FIG. 3, the cable modem is a subscriber device used over a CATV network employing a conventional HFC network architecture for data communication and includes an RF tuner 310, a quadrature amplitude modulation (QAM) demodulator 320, a data over cable service interface specification (DOCSIS) media access control (MAC) module 330, a QAM modulator 340, and a controller 350.

The RF tuner 310 performs filtering in synchronization with a frequency channel band of 6 MHz allocated to the RF tuner 310 among received downstream signals in the frequency range of 50 MHz to 780 MHz. The QAM demodulator 320 performs QAM digital demodulation on the filtered downstream signal so as to restore an original digital signal. The DOCSIS MAC module 330 performs a core function of the cable modem and is used to determine an upstream/downstream transmission frequency band for data communication with the CMTS included in the SO and to control transmission of a data signal. The DOCSIS MAC module 330 performs a standardized function. The DOCSIS 2.0 standard has now been completed. The QAM modulator 340 modulates a digital signal into a QAM signal in order to improve transmission efficiency in a predetermined frequency range when a signal is transmitted upstream. The controller 350 controls the DOCSIS MAC module 330 and performs a control function for operational management of modems.

In the past, CATV networks employing the conventional HFC network architecture mainly aimed at providing a CATV broadcast service unilaterally. Since an interactive data service such as an Internet service, a video on demand (VOD) service, and a telephony service is provided by utilizing a portion of bandwidth over the existing network, an upstream bandwidth is constrained. In order to solve the problem, a method has been taken into account in which a cell size is reduced while enlarging a bandwidth to 3 GHz. Furthermore, a cable modem standard such as DOCSIS 3.0 is being developed. However, unlike the xDSL, an RF signal is used in the CATV network. Therefore, signals are not easily converted into the FTTH format.

In terms of a service, in order for a cable provider to be able to provide an interactive data service, network management needs to be carried out on a real time basis so as to ensure signal quality of the HFC network. However, network management cannot be easily carried out over the existing HFC network.

SUMMARY OF THE INVENTION

The present invention provides an optical network unit (ONU) and an optical cable modem which perform a function required when a coaxial cable is replaced with an optical cable in a cable television (CATV) network employing a conventional hybrid-fiber coaxial (HFC) architecture.

The present invention also provides a data processing method of the ONU and the optical cable modem.

According to an aspect of the present invention, there is provided an ONU that receives an optical downstream signal from a SO (system operator) and transmits the optical downstream signal to an optical cable modem receiving the optical downstream signal and transmitting an optical upstream signal, comprising: a downstream optical-to-electrical converter that converts the downstream signal into an electrical signal; an optical cable modem transmission controller that generates a control signal containing information on a transmission order bandwidth allocation for upstream transmission of the optical cable modem; and a downstream electronic-to-optical converter that converts the control signal and the downstream signal, which is converted into the electrical signal, into optical signals and transmits the optical signals to the optical cable modem.

According to another aspect of the present invention, there is provided an ONU that receives an optical upstream signal from an optical cable modem, which receives an optical downstream signal and transmits the optical upstream signal, and transmits the received optical upstream signal to an SO, comprising: an upstream optical-to-electrical converter that converts an upstream error detection signal, which is generated by the optical cable modem to recognize the quality of the upstream signal of an optical cable, and the upstream signal into electrical signals; and an upstream data error detector that analyzes the error detection signal converted into the electrical signal so as to detect an error.

According to another aspect of the present invention, there is provided an ONU that receives an optical upstream signal from an optical cable modem, which receives an optical downstream signal and transmits the optical upstream signal, and transmits the received optical upstream signal to an SO, comprising: an upstream optical-to-electrical converter that converts information, which is inserted by the optical cable modem and is associated with a target frequency of the optical upstream signal, and the upstream signal into electrical signals; an upstream RF (radio frequency) band controller that analyzes the information in association with the target frequency converted into the electrical signal and converts the upstream signal converted into the electrical signal into a signal in a range of the target frequency; and an upstream electrical-to-optical converter that converts the upstream signal, which is converted into the signal in a range of the target frequency, into an optical signal and transmits the optical signal to the SO.

According to another aspect of the present invention, there is provided an optical cable modem comprising: an optical-to-electrical converter that converts a control signal, which is received from an ONU transmitting an optical downstream signal and contains information on a transmission order and bandwidth allocation for upstream transmission of the optical cable modem, and the downstream signal into electrical signals; a data transmission controller that analyzes the control signal converted into the electrical signal so as to control the transmission order and a bandwidth of the upstream signal; and an electrical-to-optical converter that converts the upstream signal controlled by the data transmission controller into an optical signal and transmits the optical signal to the ONU receiving the optical upstream signal.

According to another aspect of the present invention, there is provided a signal processing method of an ONU that receives an optical downstream signal from a SO and transmits the optical downstream signal to an optical cable modem receiving the optical downstream signal and transmitting an optical upstream signal, comprising: (a) converting the downstream signal into an electrical signal; (b) generating a control signal containing information on a transmission order and bandwidth allocation for upstream transmission of the optical cable modem; and (c) converting the control signal and the downstream signal, which is converted into the electrical signal, into optical signals and transmitting the optical signals to the optical cable modem.

According to another aspect of the present invention, there is provided a signal processing method of an ONU that receives an optical upstream signal from an optical cable modem, which receives an optical downstream signal and transmits the optical upstream signal, and transmits the received optical upstream signal to an SO, comprising: (a) converting an upstream error detection signal, which is generated by the optical cable modem to recognize the quality of the upstream signal of an optical cable, and the upstream signal into electrical signals; and (b) analyzing the error detection signal converted into the electrical signal so as to detect an error.

According to another aspect of the present invention, there is provided a signal processing method of an ONU that receives an optical upstream signal from an optical cable modem, which receives an optical downstream signal and transmits the optical upstream signal, and transmits the received optical upstream signal to an SO, comprising: (a) converting information, which is inserted by the optical cable modem and is associated with a target frequency of the optical upstream signal, and the upstream signal into electrical signals; (b) analyzing the information in association with the target frequency converted into the electrical signal and converting the upstream signal converted into the electrical signal into a signal in a range of the target frequency; and (c) converting the upstream signal, which is converted into the signal in a range of the target frequency, into an optical signal and transmitting the optical signal to the SO.

According to another aspect of the present invention, there is provided a signal processing method in an optical cable modem comprising: (a) converting a control signal, which is received from an ONU transmitting an optical downstream signal and contains information on a transmission order and bandwidth allocation for upstream transmission of the optical cable modem, and the downstream signal into electrical signals; (b) analyzing the control signal converted into the electrical signal so as to control the transmission order and a bandwidth of the upstream signal; and (c) converting the upstream signal controlled by the data transmission controller into an optical signal and transmitting the optical signal to the ONU receiving the optical upstream signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 4:
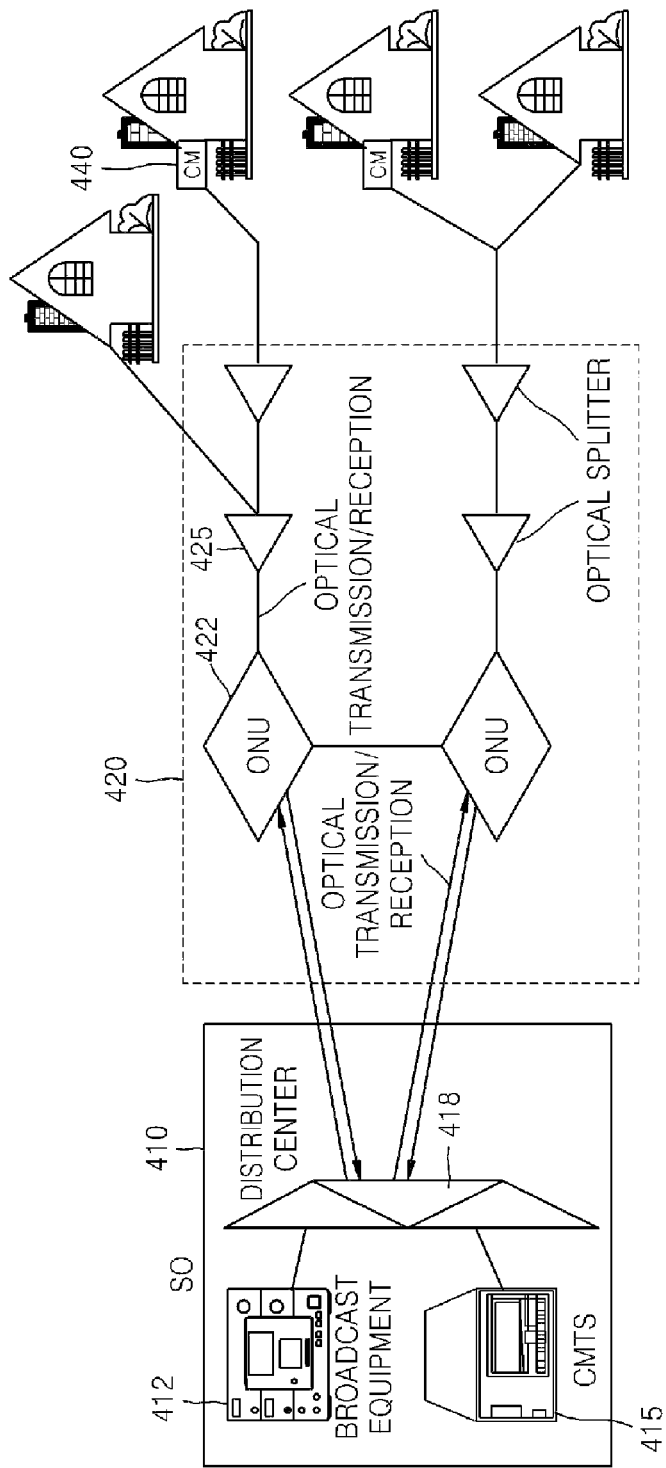
FIG. 4 illustrates a structure of an electro-optical CATV network according to an embodiment of the present invention.

FIG. 4 illustrates a structure of an electro-optical cable television (CATV) network according to an embodiment of the present invention.

Referring to FIG. 4, the electro-optical CATV network includes a system operator (SO) 410, which is a service provider that provides a broadcast service to a subscriber by modifying a program received from a program provider (PP) and its own production program, and a cable subscriber distribution network 420 which transmits a signal from the SO 410 to a subscriber's optical cable modem 440.

In FIG. 4, a coaxial cable part of the CATV network employing the conventional hybrid-fiber coaxial (HFC) network architecture is replaced with an optical cable. This is similar to the structure of the CATV network employing the conventional HFC network shown in FIG. 1. However, there is a difference in that all cables of the cable subscriber distribution network 420 shown in FIG. 4 from a distribution center 418 to the subscriber's optical cable modem 440 are optical cables.

Figure 1:
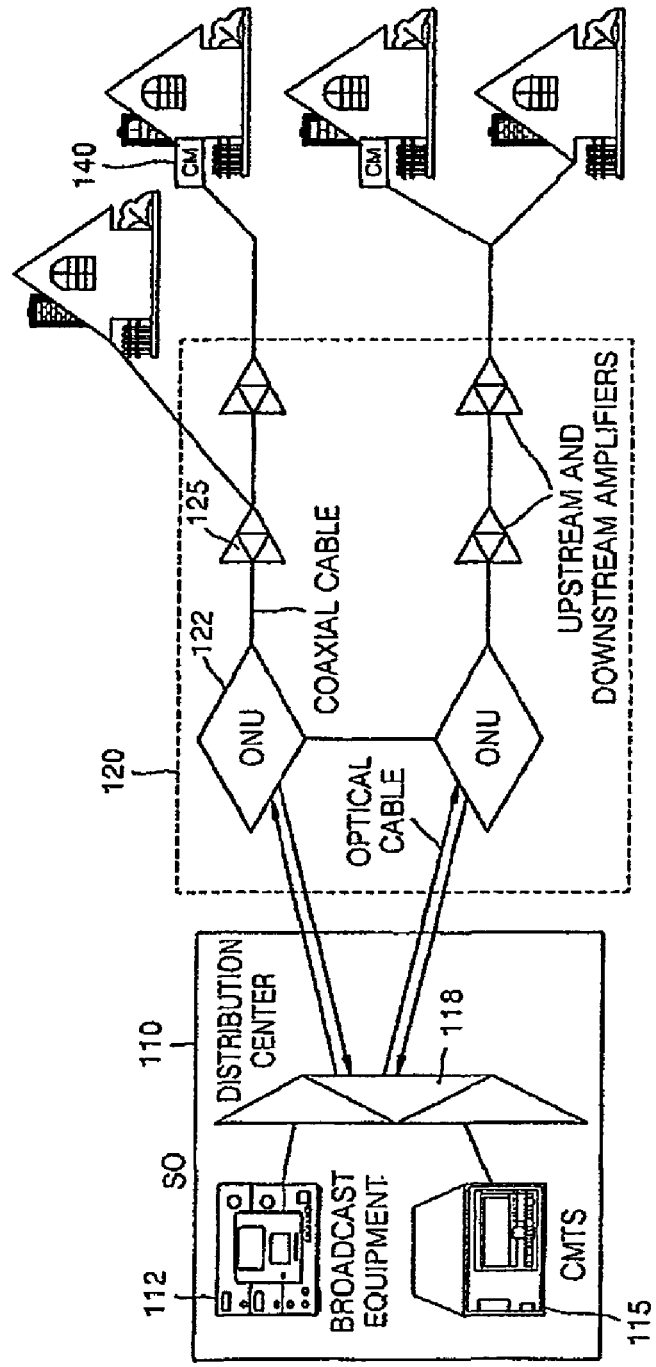
FIG. 1 illustrates a structure of a cable television (CATV) network employing a conventional hybrid-fiber coaxial (HFC) network architecture.
Figure 2:
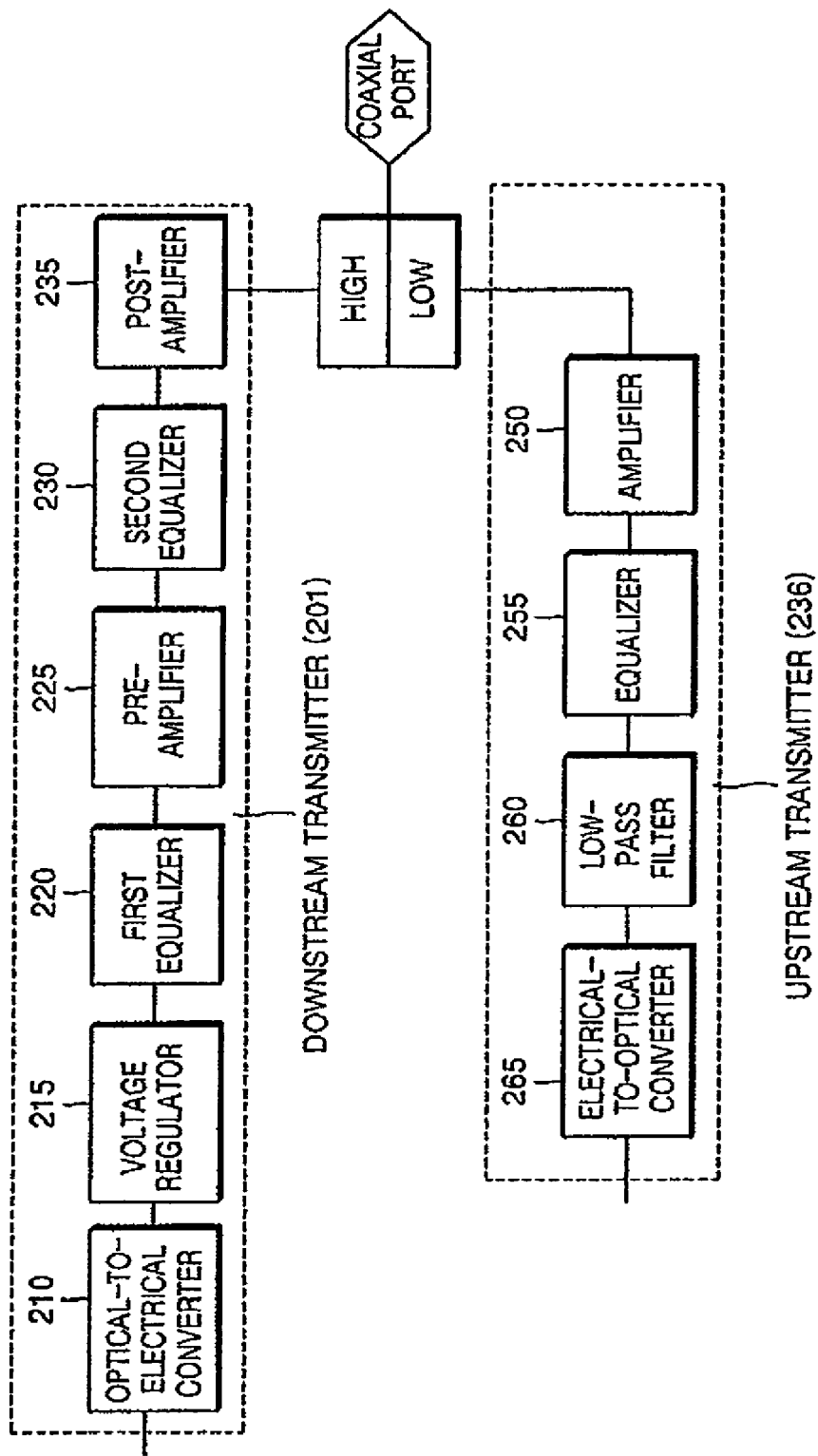
FIG. 2 is a functional block diagram of an optical network unit (ONU) in a CATV network employing a conventional HFC network architecture.
Figure 3:
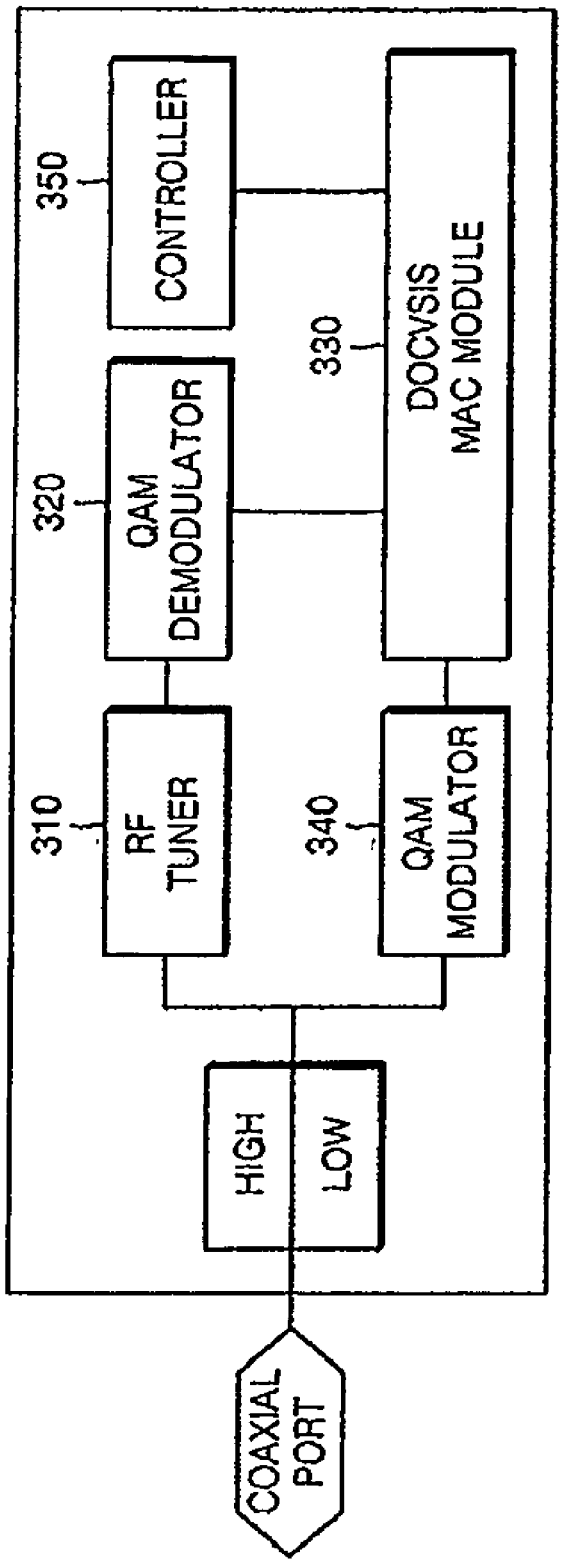
FIG. 3 is a functional block diagram of a cable modem in a CATV network employing a conventional HFC network architecture.

Similar to the CATV network employing the conventional HFC network architecture shown in FIG. 1, the SO 410 includes broadcast equipment 412, which sends received contents to a subscriber or sends the received contents to the subscriber after inserting its own advertisements or subtitles, a cable modem transmission system (CMTS) 415, and the distribution center 418. The cable subscriber distribution network 420 of the electro-optical CATV network from the SO 410 to the subscriber's optical cable modem 440 includes an optical network unit (ONU) 422 which accesses an optical signal transmitted from the SO 410 so as to amplify the optical signal and an optical signal splitter 425 which provides the split optical signal from the ONU 422 to the subscriber's optical cable modem 440. In this case, functions of the OUN 422 are differently performed.

The ONU 422 accesses the SO 410 communicating in a form of an optical signal and amplifies a downstream optical signal so that the signal can be transmitted to the subscriber. Comparing the ONU 422 with the ONU 122 used in the CATV network employing the conventional HFC network architecture, the ONU 422 additionally requires an element to transmit an optical signal, since an optical cable is used instead of a coaxial cable, so that the signal can be transmitted up to the subscriber's optical cable modem 440.

In order to increase the number of subscribers accessing the ONU 422, the optical signal splitter 425 is disposed between the ONU 422 and the subscriber's optical cable modem 440 as an optical passive element. The optical signal splitter 425 splits and expands an optical signal in the ratio of 1:N.

The subscriber's optical cable modem 440 is a subscriber terminal device capable of interactive data communication. The optical signal is controlled by the ONU 422. A radio frequency (RF) signal is controlled by the CMTS 415.

Figure 5:
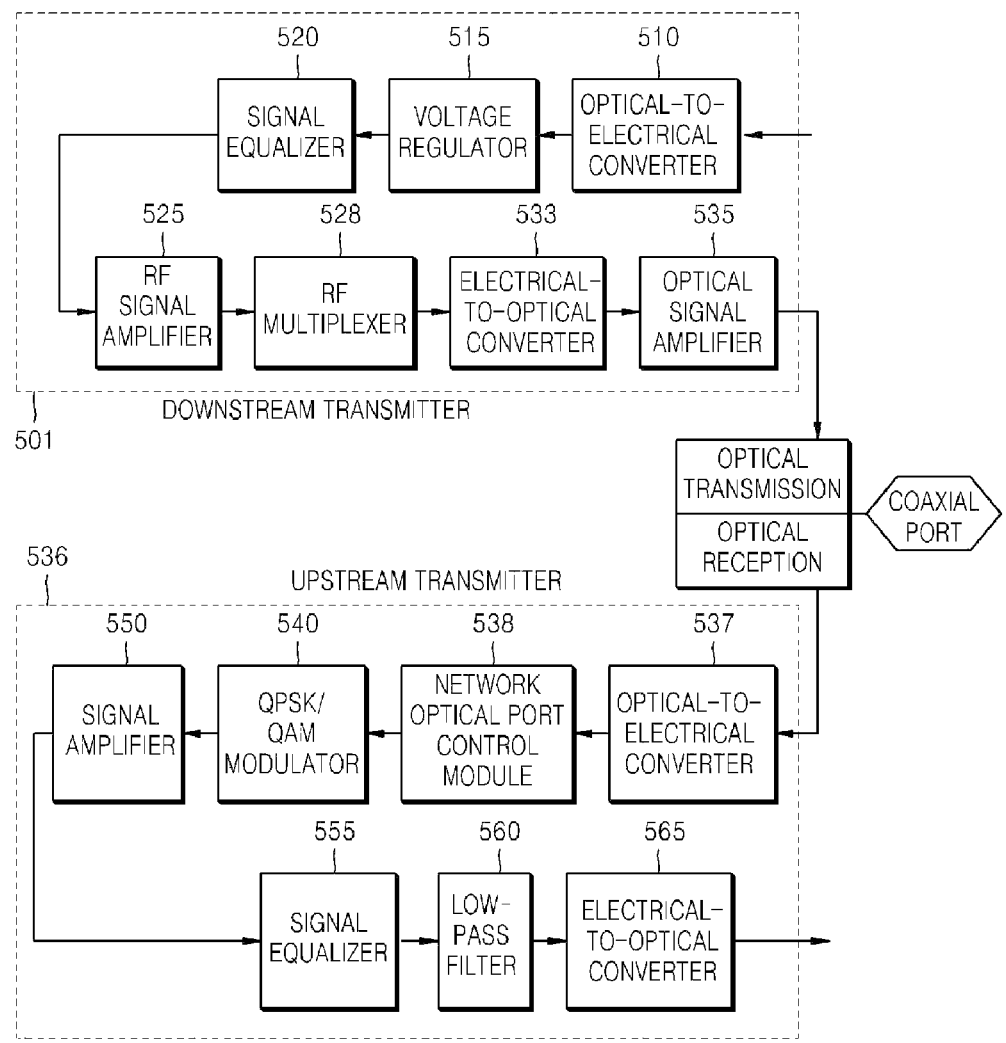
FIG. 5 is a functional block diagram of an ONU in an electro-optical CATV network according to an embodiment of the present invention.

FIG. 5 is a functional block diagram of an ONU in an electro-optical CATV network according to an embodiment of the present invention.

Referring to FIG. 5, a downstream transmitter 501 of the ONU in the electro-optical CATV network includes an optical-to-electrical converter 510, a voltage regulator 515, a signal equalizer 520, an RF signal amplifier 525, an RF multiplexer 528, an electrical-to-optical converter 533, and an optical signal amplifier 535.

The optical-to-electrical converter 510 converts an optical signal transmitted from an SO into an electrical RF signal in the frequency range of 50 MHz to 780 MHz. The voltage regulator 515 regulates a voltage level of the RF signal. The signal equalizer 520 equalizes a frequency characteristic of the RF signal whose voltage level is regulated. In particular, the signal equalizer 520 reproduces an attenuated high frequency component.

Since a low power RF signal is received, the RF signal amplifier 525 amplifies a signal level according to an input of the optical signal amplifier 535. In practice, similar to the ONU used in the CATV network employing the conventional HFC network architecture, a signal is split in the ONU so as to accommodate many subscribers. Therefore, the RF signal amplifier 525 is provided.

The RF multiplexer 528 multiplexes a cable subscriber distribution network control signal, which is generated by a network optical port control module 538 so as to control a subscriber optical distribution link and to recognize signal quality between the ONU and the subscriber's optical cable modem and an RF signal converted into a specific frequency range, and a downstream RF signal which is actual data amplified by the RF signal amplifier 525. For example, one of the simplest methods of implementing a control signal for recognizing signal quality over the electro-optical CATV network may be a method of measuring a cyclic redundancy code (CRC) or a bit error rate (BER).

The electrical-to-optical converter 533 converts the downstream signal and the control signal multiplexed by the RF multiplexer 528 into optical signals. Since many subscribers are connected through the optical signal splitter 425, in order to compensate for an optical signal level attenuated due to a signal transfer splitting function, the optical signal amplifier 535 amplifies the optical signal.

In the electro-optical CATV network, an upstream transmitter 536 of the ONU includes an optical-to-electrical converter 537, the network optical port control module 538, a quadrature phase shift key (QPSK)/quadrature amplitude modulation (QAM) modulator 540, a signal amplifier 550, a signal equalizer 555, a low-pass filter 560, and an electrical-to-optical converter 565.

The optical-to-electrical converter 537 converts an optical signal transmitted from a subscriber's optical cable modem into an RF signal. The network optical port control module 538 controls an upstream transfer function of multiple subscribers for an upstream signal over a cable subscriber distribution network between the ONU and the subscriber's optical cable modems. Examples of main transfer functions controlled by the network optical port control module 538 include a ranging function of an optical signal depending on a distance, a subscriber's bandwidth control function, and a transfer order management function for each subscriber. Furthermore, as a network management function for managing the quality of the cable subscriber distribution network, the network optical port control module 538 provides a function in which a control signal is transmitted downstream from the OUN to the subscriber's cable modem, and a signal, which is associated with a control function and is received upstream, is analyzed so as to check the signal quality.

In order to communicate with the CMTS in the SO, the QPSK/QAM modulator 540 digitally modulates a signal in the base-band range received through the cable subscriber distribution network into an RF signal in the upstream frequency range. The signal amplifier 550 amplifies the digitally modulated upstream RF signal. The signal equalizer 555 equalizes a frequency characteristic of the amplified upstream RF signal.

The low-pass filter 560 passes only a frequency band corresponding to the upstream signal in order to remove noise generated in the high frequency band. The electrical-to-optical converter 565 converts an electrical RF signal in the frequency range of 5 MHz to 48 MHz into an optical signal of 1310 nm and transmits the optical signal to the SO.

The ONU of the electro-optical CATV network of the present invention is different from the ONU of the CATV network employing the conventional HFC network architecture in that the network optical port control module 538 and the QPSK/QAM modulator 540 are present for the upstream signal. That is, the network optical port control module 538 controls an optical signal over the entire bandwidth instead of an RF signal between the ONU and each optical network terminal (ONT). The ONU handles a signal converted into an RF signal by each ONT.

Figure 6:
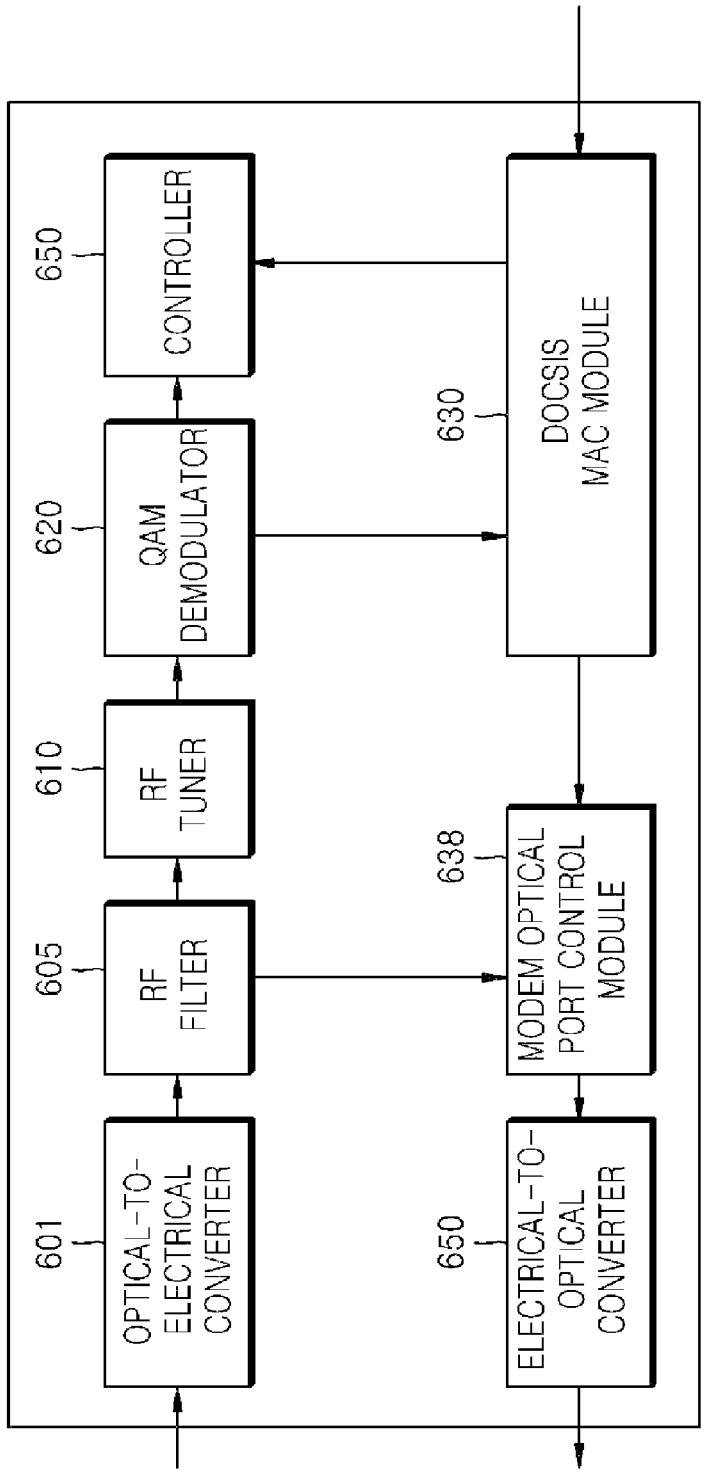
FIG. 6 is a functional block diagram of an optical cable modem in an electro-optical CATV network according to an embodiment of the present invention.

FIG. 6 is a functional block diagram of an optical cable modem in an electro-optical CATV network according to an embodiment of the present invention.

Referring to FIG. 6, the optical cable modem is a subscriber device used for data communication over the electro-optical CATV network of the present invention. The optical cable modem includes an optical-to-electrical converter 601, an RF filter 605, an RF tuner 610, a QAM demodulator 620, a controller 650, a data over cable service interface specification (DOCSIS) media access control (MAC) module 630, a modem optical port control module 638, and an electrical-to-optical converter 650.

The optical-to-electrical converter 601 converts a downstream signal, which is actual data, and a subscriber signal quality control signal which is converted into an optical signal to be transmitted by the ONU, into RF signals. The RF filter 605 separates the downstream signal and the subscriber signal quality control signal from a signal converted into the RF signal by the optical-to-electrical converter 601.

The RF tuner 610 filters the downstream signal filtered through the RF filter 605 in synchronization with a frequency channel band received by its own modem. The QAM demodulator 620 performs QAM digital demodulation on the filtered frequency channel signal so as to restore an original digital signal in the base-band range.

The controller 650 controls the DOCSIS MAC module 630 and controls operational management of the optical cable modem. The operation of the DOCSIS MAC module 630 is similar to that of the DOCSIS MAC module 330 of the CATV network employing the conventional HFC network architecture. As a main function of the optical cable modem, the DOCSIS MAC module 630 determines a frequency band of upstream/downstream transmission frequency band, and controls transmission of a data signal for data communication with the CMTS included in the SO. The DOCSIS MAC module 630 basically uses a standardized DOCSIS MAC function so as to be compatible with the DOCSIS MAC module 330 used in the CATV network employing the conventional HFC network architecture.

The modem optical port control module 638 controls a subscriber function that transmits an upstream signal to the ONU over the electro-optical CATV network. In response to a control signal transmitted from the ONU, the modem optical port control module 638 controls a bandwidth of the upstream signal and performs a data transfer function. Furthermore, in conjunction with the optical port control module 538, the modem optical port control module 638 performs a network management function to manage the quality of the subscriber network. The modem optical port control module 638 transmits a control signal to the ONU upstream and analyzes a signal in association with a control function separated by and received downstream from the RF filter 605 so that the signal quality can be checked.

Figure 7:
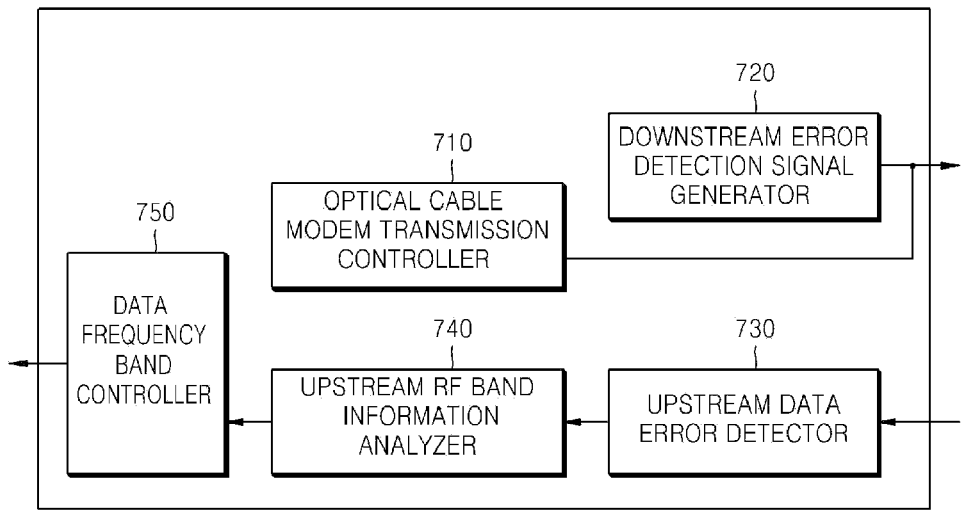
FIG. 7 is a functional block diagram of a network optical port control module of an ONU in an electro-optical CATV network according to an embodiment of the present invention.

FIG. 7 is a functional block diagram of a network optical port control module of an ONU in an electro-optical CATV network according to an embodiment of the present invention.

Referring to FIG. 7, the network optical port control module includes an optical cable modem transmission controller 710, a downstream error detection signal generator 720, an upstream data error detector 730, an upstream RF band information analyzer 740, and a data frequency band controller 750.

The optical cable modem transmission controller 710 generates information on a transmission order and bandwidth allocation for upstream transmission of each optical cable modem that is a subscriber device and transmits the generated information to each optical cable modem. The downstream error detection signal generator 720 detects a signal indicating an error in the optical cable modem from a signal transmitted downstream up to the subscriber and inserts a signal for all ONUs or each ONU so that the signal quality of an optical path can be recognized.

A signal transmitted from the optical cable modem transmission controller 710 and the downstream error detection signal generator 720 to the subscriber is converted into an RF signal. The converted RF signal is transmitted after being multiplexed by the RF multiplexer 528. The upstream data error detector 730 analyzes error detection data transmitted from the optical cable modem to the ONU in order to recognize the signal quality of the optical path for the signal transmitted upstream. The upstream RF band information analyzer 740 analyzes information on a frequency band of the upstream signal determined between the CMTS and the optical cable modem. In this case, the information on the frequency band is inserted by the optical cable modem.

The data frequency band controller 750 controls a frequency band for each upstream signal which is received so as to transmit data in a requested frequency band so that the upstream signal received from the subscriber's cable modem can be transmitted to the CMTS. At present, in order to provide an interactive data service, the cable modem included in the CATV network employing the conventional HFC network architecture has to expand an upstream bandwidth. Therefore, if the upstream bandwidth will be expanded, a new frequency band which has not been defined in the standard has to be used. The data frequency band controller 750 performs a function to handle this case.

Figure 8:
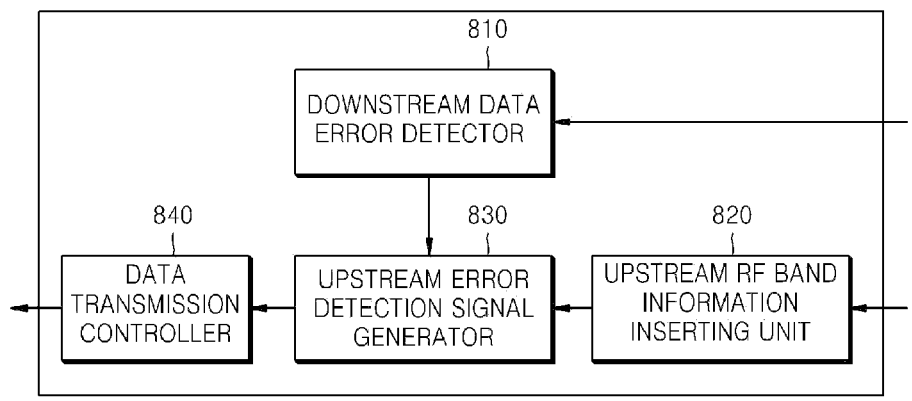
FIG. 8 is a functional block diagram of a modem optical port control module of an optical cable modem in an electro-optical CATV network according to an embodiment of the present invention.

FIG. 8 is a functional block diagram of a modem optical port control module of an optical cable modem in an electro-optical CATV network according to an embodiment of the present invention.

Referring to FIG. 8, the modem optical port control module includes a downstream data error detector 810, an upstream RF band information inserting unit 820, an upstream error detection signal generator 830, and a data transmission controller 840.

The downstream data error detector 810 analyzes error detection data inserted to recognize the obstacle and the quality of an optical path for a signal transmitted downstream from the ONU and reports the analyzed obstacle and quality of the optical path to the ONU. The upstream RF band information inserting unit 820 inserts information on a frequency channel so that information on a frequency band of the upstream signal determined between the CMTS and the optical cable modem can be analyzed by the ONU.

The upstream error detection signal generator 830 inserts error detection data in order to recognize the signal quality of the optical path for the signal transmitted upstream. In this case, the inserted data is used by the ONU for error detection and is also used for network management by an operator. As a sub-function for the control function of the optical cable modem transmission controller 710 of the ONU, the data transmission controller 840 analyzes the control signal received by the optical cable modem transmission controller 710 so as to control a bandwidth and a transmission time.

The electro-optical CATV network of the present invention is characterized in that a signal is transmitted between the ONU and the subscriber optical cable modem in the format of a passive optical network (PON), and information on each cable modem is controlled by the ONU. In addition, while the downstream signal is transmitted in the format of the RF signal, the upstream signal is transmitted up to the ONU in the base-band range and is then converted into an RF signal by the OUN to be transmitted to the CMTS.

According to the present invention, a cable television (CATV) network employing the conventional hybrid-fiber coaxial (HFC) network architecture is implemented with an optical cable instead of a coaxial cable. Thus, an optical network unit (ONU) performing a required function, an optical cable modem, and a data processing method for the ONU and the optical cable modem are provided. As a result, a wired network structure which is evolved to a fiber to the home (FTTH) structure can be developed. Furthermore, a coaxial cable can be implemented in a cost effective manner, and real time based network management can be achieved for signal quality of an optical path. In addition, equipment used in the CATV network employing the conventional HFC network architecture can be applied to the present invention without alteration. Therefore, compliance with the conventional CATV network can be maintained. Moreover, future expansion of not only a downstream frequency bandwidth but also an upstream frequency bandwidth can be easily implemented.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An ONU (optical network unit) that receives an optical downstream signal from a SO (system operator) and transmits the optical downstream signal to an optical cable modem receiving the optical downstream signal and transmitting an optical upstream signal, comprising:
   a downstream optical-to-electrical converter that converts the downstream signal into an electrical signal;
   an optical cable modem transmission controller that generates a control signal containing information on a transmission order and bandwidth allocation for upstream transmission of the optical cable modem; and
   a downstream electronic-to-optical converter that converts the control signal and the downstream signal, which is converted into the electrical signal, into optical signals and transmits the optical signals to the optical cable modem.

2. The ONU of claim 1, further comprising an RF (radio frequency) multiplexer that multiplexes the control signal and the downstream signal which is converted into the electrical signal, wherein the downstream electronic-to-optical converter converts the multiplexed control and downstream signals into optical signals.

3. The ONU of claim 1, further comprising a downstream error detection signal generator that generates an error detection signal in order to recognize signal quality of an optical cable, wherein the downstream electrical-to-optical converter converts the error detection signal, the control signal, and the downstream signal, which is converted into the electrical signal, into optical signals to be transmitted to the optical cable modem.

4. The ONU of claim 1, further comprising an optical signal amplifier that amplifies the control signal and the downstream signal, which are converted into the optical signals, in order to compensate for attenuation of the signals caused by splitting when the signals are transmitted to several optical cable modems.

5. The ONU of claim 1, further comprising:
   a voltage regulator that regulates voltage of the downstream signal converted into the optical signal;
   a signal equalizer that controls a frequency characteristic of the downstream signal whose voltage is regulated; and
   a signal amplifier that amplifies power of the downstream signal whose frequency characteristic is controlled,
   wherein the downstream electronic-to-optical converter converts the downstream signal whose power is amplified into an optical signal and transmits the optical signal to the optical cable modem.

6. An ONU (optical network unit) that receives an optical upstream signal from an optical cable modem, which receives an optical downstream signal and transmits the optical upstream signal, and transmits the received optical upstream signal to an SO (system operator), comprising:
   an upstream optical-to-electrical converter that converts an upstream error detection signal, which is generated by the optical cable modem to recognize the quality of the upstream signal of an optical cable, and the upstream signal into electrical signals;
   an upstream data error detector that analyzes the error detection signal converted into the electrical signal so as to detect an error;
   a signal amplifier that amplifies power of the upstream signal converted into the electrical signal;
   a signal equalizer that controls a frequency characteristic of the upstream signal whose power is amplified;
   a low-pass filter that passes an upstream frequency band of the upstream signal whose frequency characteristic is controlled; and
   an upstream electrical-to-optical converter that converts the upstream signal passed through the low-pass filter into an optical signal and transmits the optical signal to the SO.

7. An ONU (optical network unit) that receives an optical upstream signal from an optical cable modem, which receives an optical downstream signal and transmits the optical upstream signal, and transmits the received optical upstream signal to an SO (system operator), comprising:
   an upstream optical-to-electrical converter that converts information, which is inserted by the optical cable modem and is associated with a target frequency of the optical upstream signal, and the upstream signal into electrical signals;
   an upstream RF (radio frequency) band controller that analyzes the information in association with the target frequency converted into the electrical signal and converts the upstream signal converted into the electrical signal into a signal in a range of the target frequency; and
   an upstream electrical-to-optical converter that converts the upstream signal, which is converted into the signal in a range of the target frequency, into an optical signal and transmits the optical signal to the SO.

8. The ONU of claim 7, further comprising:
   a signal amplifier that amplifies power of the upstream signal converted into the electrical signal;
   a signal equalizer that controls a frequency characteristic of the upstream signal whose power is amplified; and
   a low-pass filter that passes an upstream frequency band of the upstream signal whose frequency characteristic is controlled,
   wherein the upstream electrical-to-optical converter converts the upstream signal passed through the low-pass filter into an optical signal and transmits the optical signal to the SO.

9. An optical cable modem comprising:
   a DOCSIS (data over cable service interface specification) MAC (media access control) module that determines a transmission frequency band for communication with an SO (system operator);
   an optical-to-electrical converter that converts a control signal, which is received from an ONU (optical network unit) transmitting an optical downstream signal and contains information on a transmission order and bandwidth allocation for upstream transmission of the optical cable modem, and the downstream signal into electrical signals;
   a data transmission controller that analyzes the control signal converted into the electrical signal so as to control the transmission order and a bandwidth of the upstream signal; and
   an electrical-to-optical converter that converts the upstream signal controlled by the data transmission controller into an optical signal and transmits the optical signal to the ONU receiving the optical upstream signal.

10. The optical cable modem of claim 9,
    wherein the optical-to-electrical converter converts a signal obtained by multiplexing the control signal and the downstream signal into an electrical signal;
    wherein the optical cable modem further comprises an RF (radio frequency) filter that filters the multiplexed signal of the control and downstream signals converted into the electrical signal, and
    wherein the data transmission controller analyzes the control signal filtered through the RF filter so as to control the transmission order and the bandwidth of the upstream signal.

11. The optical cable modem of claim 9,
    wherein the optical-to-electrical converter converts a downstream error detection signal, which is generated by the ONU transmitting the optical downstream signal to recognize the quality of the downstream signal of an optical cable, and the downstream signal into electrical signals, and
    wherein the optical cable modem further comprises a downstream data error detector that analyzes the error detection signal converted into the electrical signal so as to detect an error.

12. The optical cable modem of claim 9, further comprising:
    an RF tuner that filters the downstream signal converted into the electrical signal in synchronization with a target frequency band;
    a QAM (quadrature amplitude modulation) demodulator that demodulates the filtered downstream signal; and
    a controller that controls the DOCSIS MAC module and operational management,
    wherein the DOCSIS MAC module further controls the downstream signal.

13. The optical cable modem of claim 9, further comprising an upstream error detection signal generator that generates an upstream error detection signal in order to recognize signal quality of an optical cable, wherein the electrical-to-optical converter converts the error detection signal and the upstream signal into optical signals and transmits the optical signals to the ONU.

14. The optical cable modem of claim 9, further comprising an upstream RF band information inserting unit that inserts information in association with the target frequency so that the ONU receiving the optical upstream signal can analyze the information in association with the target frequency of the upstream signal, wherein the electrical-to-optical converter converts the information in association with the target frequency and the upstream signal into optical signals and transmits the optical signals to the ONU.

* * * * *